US012770127B2

(12) United States Patent
Bhatia

(10) Patent No.: US 12,770,127 B2
(45) **Date of Patent: *Oct. 20, 2026**

(54) METHODS FOR PROVIDING SYSTEMATIC INTELLIGENCE FOR SELECTING MODE OF PAYMENT AND DEVICES THEREOF

(71) Applicant: JPMorgan Chase Bank, N.A., New York, NY (US)

(72) Inventor: Nitin Bhatia, Hockessin, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 69 days.

This patent is subject to a terminal disclaimer.

(21) Appl. No.: 18/933,011

(22) Filed: Oct. 31, 2024

(65) Prior Publication Data

US 2025/0053950 A1 Feb. 13, 2025

Related U.S. Application Data

(63) Continuation of application No. 16/142,443, filed on Sep. 26, 2018, now Pat. No. 12,165,123.

(Continued)

(51) Int. Cl.

| | |
|---|---|
| ***G06Q 20/22*** | (2012.01) |
| ***G06Q 20/12*** | (2012.01) |
| ***G06Q 20/32*** | (2012.01) |
| ***G06Q 20/40*** | (2012.01) |
| ***H04W 4/029*** | (2018.01) |
| ***H04W 8/18*** | (2009.01) |

(Continued)

(52) U.S. Cl.

CPC ........... *G06Q 20/227* (2013.01); *G06Q 20/12* (2013.01); *G06Q 20/3223* (2013.01); *G06Q 20/3224* (2013.01); *G06Q 20/3274* (2013.01); *G06Q 20/405* (2013.01); *H04W 4/029* (2018.02); *H04W 8/18* (2013.01); *H04M 1/72403* (2021.01); *H04W 88/02* (2013.01)

(58) Field of Classification Search

None

See application file for complete search history.

(56) References Cited

U.S. PATENT DOCUMENTS 8,812,014 B2 * 8/2014 Do ............................ G01S 5/18 455/418

2009/0112766 A1 4/2009 Hammad et al.

(Continued)

*Primary Examiner* — David P Sharvin

(74) *Attorney, Agent, or Firm* — Greenblum & Bernstein, P.L.C.

(57) ABSTRACT

Various systems, methods, and media for facilitating selection of a transaction mode for an electronic transaction are provided. User identification information, that identifies a user of a user device that performs the electronic transaction, is obtained. User accounts are determined based on the user identification information. Location information of the user device is also obtained, and at least one of sound information detected by a microphone of the user device or light information detected by a camera of the user device is further obtained. A single merchant is determined based on the location information of the user device and the at least one of the sound information or the light information. The user accounts are analyzed, and a recommended user account is determined based on the single merchant. A notification to be displayed on the user device is generated based on the recommended user account.

19 Claims, 6 Drawing Sheets

Related U.S. Application Data

(60) Provisional application No. 62/563,473, filed on Sep. 26, 2017.

(51) Int. Cl.
*H04M 1/72403* (2021.01)
*H04W 88/02* (2009.01)

(56) References Cited

U.S. PATENT DOCUMENTS

2013/0045751 A1* 2/2013 Chao .................. G01C 21/3602 455/456.1
2015/0302383 A1* 10/2015 Mills .................... G06Q 20/227 705/39
2016/0092923 A1* 3/2016 Grenier .............. G06Q 30/0236 705/14.58
2016/0196549 A1* 7/2016 Mizhen .................. G06Q 30/06 705/26.41
2016/0328698 A1* 11/2016 Kumaraguruparan ....................... H04W 4/029

* cited by examiner

METHODS FOR PROVIDING SYSTEMATIC INTELLIGENCE FOR SELECTING MODE OF PAYMENT AND DEVICES THEREOF

CROSS-REFERENCE TO RELATED APPLICATIONS

This is a continuation of U.S. patent application Ser. No. 16/142,443, filed Sep. 26, 2018, which claims the benefit of U.S. Provisional Patent Application No. 62/563,473, filed Sep. 26, 2017. The disclosure of each of the above-mentioned documents, including the specification, drawings, and claims, is incorporated herein by reference in its entirety.

BACKGROUND

1. Field of the Disclosure

This technology generally relates to automatically facilitating selection of a transaction mode and, more particularly, to methods and devices for systematic intelligence for selecting a transaction mode.

2. Background Information

In the current marketplace electronic payment transactions at point of sale terminals (e.g., merchant retail stores, e-commerce websites) are performed using various digital wallets on smart devices. Customers can use various payment approaches over a multitude of communications channels (e.g., Bluetooth, RFID, NFC) in order to make purchases. The various payment approaches (e.g., digital wallets) used for making purchases have various modes of payment (e.g., credit cards, debits cards, bank accounts) to make a purchase. However, the selection of one these various modes of payment by the customer during a checkout is randomly performed by the customer.

Unfortunately, there is no systematic intelligence available that would recommend to the customer which one of the various modes of payment is best suited to the customer at the time of purchase. As a result, the random selection of one of the modes of payment often may not be in the best interest of the customer.

SUMMARY OF THE DISCLOSURE

The present disclosure, through one or more of its various aspects, embodiments, and/or specific features or sub-components, provides, inter alia, various systems, servers, devices, methods, media, programs, and platforms for selecting a transaction mode. The various aspects, embodiments, features, and/or sub-components provide optimized processes of selecting and recommending a transaction mode based on available user transaction modes and a location of the user. The automatic recommendation of the transaction mode provides the user with an optimized process of making a transaction in which tangible and/or intangible benefits may be optimized, such as, for example, monetary savings and an improved credit score or history. Accordingly, by the present disclosure, a customized and intelligent transaction process is provided that significantly improves a customer and/or merchant experience, thereby increasing customer and/or merchant satisfaction.

According to an aspect of the present disclosure, a system for facilitating selection of a transaction mode is provided. The system includes a processor and a memory. The includes instructions that, when executed by the processor, cause the processor to perform operations including: obtaining user identification information, with the user identification information identifying a user of a user device and the user device performing an electronic transaction; determining a plurality of user accounts of the user based on the user identification information; obtaining location information of the user device; determining a merchant based on the location information of the user device; analyzing the plurality of user accounts; determining, based on a result of the analyzing and the merchant, a recommended user account from among the plurality of user accounts; and generating a notification to be displayed on the user device, with the notification being configured to be used to complete the electronic transaction using the recommended user account.

According to another aspect of the present disclosure, the analyzing includes: determining at least one transaction mode that is accepted by the merchant; and excluding, from the recommended user account, accounts of the plurality of user accounts that do not correspond to the at least one transaction mode that is accepted by the merchant.

According to yet another aspect of the present disclosure, the analyzing includes: determining at least one account parameter associated with each of the plurality of user accounts; and assigning a score to each of the plurality of user accounts based on the associated at least one account parameter.

According to a further aspect of the present disclosure, the score is assigned to each of the plurality of user accounts based on rules set by the user.

According to still a further another aspect of the present disclosure, the at least one account parameter includes at least one of a credit limit, an outstanding balance, an available balance, a reward, finance charges, interest charges, and credit score impact.

According to another aspect of the present disclosure, the operations further include obtaining a dollar amount of the transaction. In this regard, the score is further assigned to each of the plurality of user accounts based on the dollar amount of the transaction.

According to yet another aspect of the present disclosure, the analyzing includes: receiving, from the merchant, at least one merchant-defined parameter associated with at least one transaction mode accepted by the merchant; determining whether the at least one transaction mode corresponds to any of the plurality of user accounts; and, in response to determining the at least one transaction mode corresponds to any of the plurality of user accounts, further analyzing the plurality of user accounts based on the at least one merchant-defined parameter.

According to a further aspect of the present disclosure, the location information of the user device includes positioning information determined by a global positioning satellite device included in the user device.

According to still a further another aspect of the present disclosure, the determining the merchant includes, when a plurality of merchants is identified based on the location information of the user device, generating a list of the plurality of merchants to be displayed on the user device and requesting a selection of one of the plurality of merchants by the user.

According to another aspect of the present disclosure, the location information of the user device further includes at least one of sound information detected by a microphone of the user device or light information obtained by a camera of the user device.

According to yet another aspect of the present disclosure, the location information further includes at least the sound information detected by the microphone of the user device. The determining the merchant includes: when a plurality of merchants is identified based on the positioning information determined by the global positioning satellite device included in the user device, filtering the sound information detected by the microphone of the user device to identify at least one of a predetermined sound or speech of a predetermined user; and selecting one of the plurality of merchants as the merchant based on identification of the at least one of the predetermined sound or the speech of the predetermined user.

According to a further aspect of the present disclosure, the positioning information includes a position-trace of the user device over a predetermined period of time. In the determining the merchant, when a plurality of merchants is identified based on the positioning information, the merchant is selected from among the plurality of merchants based on a number of changes in direction in the position-trace.

According to still a further another aspect of the present disclosure, the recommended user account is determined from among the plurality of user accounts based on the result of the analyzing and the merchant, and further based on the location information of the user device.

According to another aspect of the present disclosure, the operations further include: excluding, from the recommended user account, at least one of the plurality of user accounts based on the location information of the user device.

According to yet another aspect of the present disclosure, the user identification information and the location information are received from the user device via a network, the notification is configured to be transmitted to the user device via the network, and the notification is further configured to be displayed on a display of the user device.

According to a further aspect of the present disclosure, the notification includes a QR code or a barcode that, when scanned, is configured to complete the electronic transaction using the recommended user account.

According to still a further another aspect of the present disclosure, the processor and the memory are each included in the user device.

According to another aspect of the present disclosure, each of the plurality of user accounts is associated with a same issuer or institution.

According to yet another aspect of the present disclosure, a method for facilitating selection of a transaction mode The method comprises: obtaining user identification information, the user identification information identifying a user of a user device, the user device performing an electronic transaction; determining a plurality of user accounts of the user based on the user identification information; obtaining location information of the user device; determining a merchant based on the location information of the user device; analyzing, with a processor, the plurality of user accounts; determining, with the processor and based on a result of the analyzing and the merchant, a recommended user account from among the plurality of user accounts; and generating a notification to be displayed on the user device, the notification configured to be used to complete the electronic transaction using the recommended user account.

According to a further aspect of the present disclosure, a non-transitory computer-readable medium including a set of instructions for facilitating selection of a transaction mode is provided. The set of instructions, when executed by a computer, causes the computer to perform operations comprising: obtaining user identification information, the user identification information identifying a user of a user device, the user device performing an electronic transaction; determining a plurality of user accounts of the user based on the user identification information; obtaining location information of the user device; determining a merchant based on the location information of the user device; analyzing the plurality of user accounts; determining, based on a result of the analyzing and the merchant, a recommended user account from among the plurality of user accounts; and generating a notification to be displayed on the user device, the notification configured to be used to complete the electronic transaction using the recommended user account.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

Figure 1:
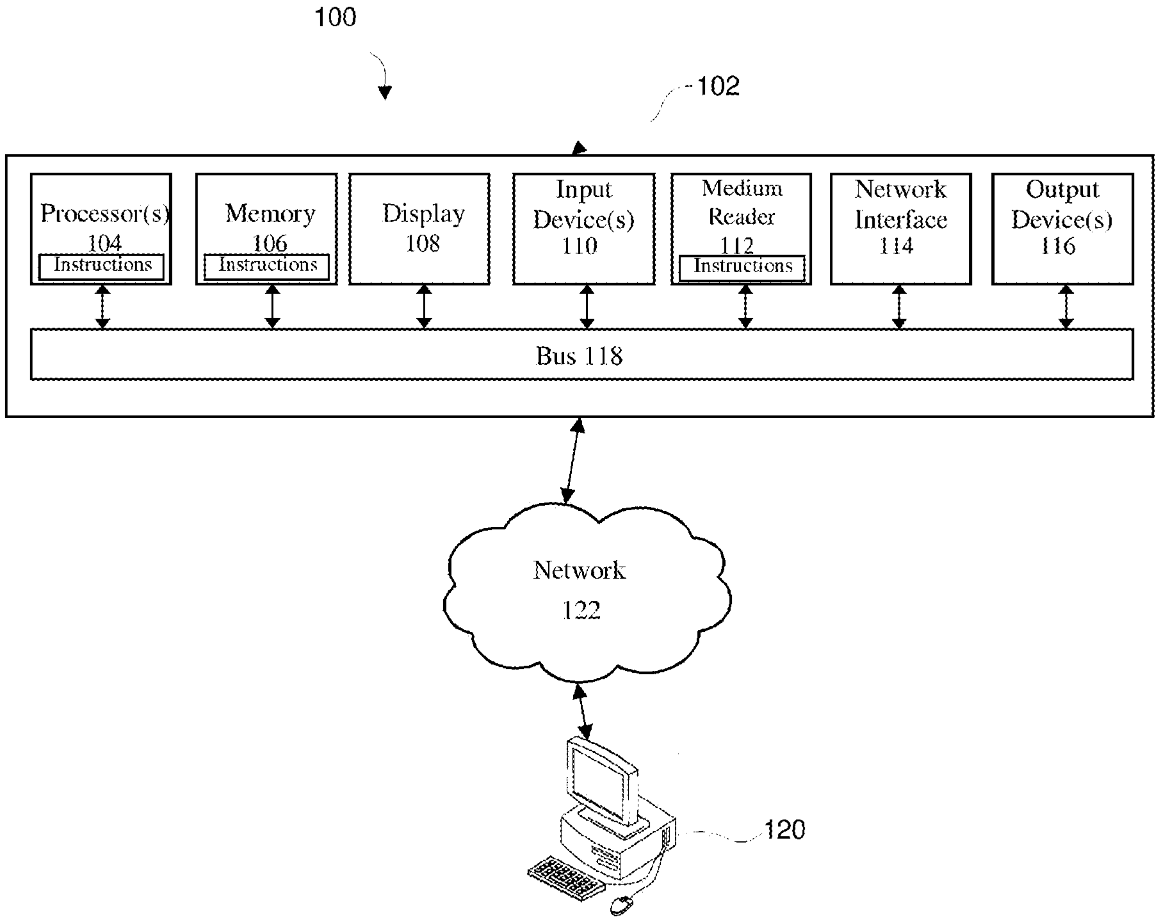
FIG. 1 illustrates an exemplary system for facilitating selection of a transaction mode.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a video display 108, such as a liquid crystal display (LCD), an organic light emitting diode (OLED), a flat panel display, a solid state display, a cathode ray tube (CRT). a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read anyone or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized processes of selecting and recommending a transaction mode based on available user transaction modes and a location of a user.

Figure 2:
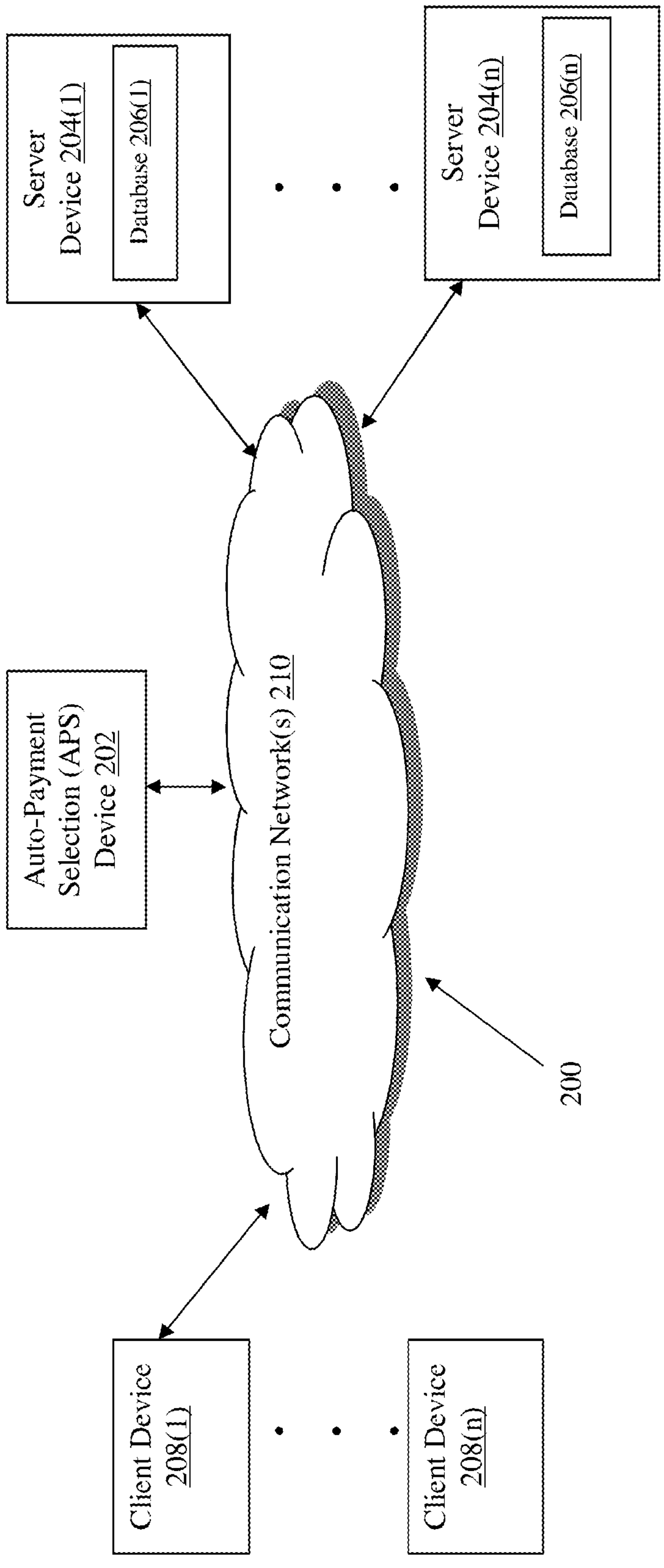
FIG. 2 illustrates an exemplary diagram of a network environment with an Auto-Payment Selection device.

Referring to FIG. 2, a schematic of an exemplary network environment 200 for automatically facilitating selection of a transaction mode for conducting a transaction is illustrated. The transaction may include or relate to the sale, rental, lease, purchase, transfer, or acquisition of goods or services. While generally described herein as being bilateral, the transaction may be a unilateral transaction or any other transaction known and understood. The mode may include or relate to a form or manner in which a payment, benefit, or other compensation is provided for the goods or services.

The selection of the mode for conducting the transaction may be facilitated by an Auto-Payment Selection (APS) device 202. The APS device 202 may be the same or similar to the computer system 102 as described with respect to FIG. 1. The APS device 202 may store one or more applications that can include executable instructions that, when executed by the APS device 202, cause the APS device 202 to perform actions, such as to transmit, receive, or otherwise process network messages, for example, and to perform other actions described and illustrated below with reference to the figures. The application(s) can be implemented as modules or components of other applications. Further, the application(s) can be implemented as operating system extensions, modules, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the APS device 202 itself, may be located in virtual server(s) running in a cloud-based computing environment rather than being tied to one or more specific physical network computing devices. Also, the application(s) may be running in one or more virtual machines (VMs) executing on the APS device 202. Additionally, in one or more embodiments of this technology, virtual machine(s) running on the APS device 202 may be managed or supervised by a hypervisor.

In the network environment 200 of FIG. 2, the APS device 202 is coupled to a plurality of server devices 204(1)-204(*n*) that hosts a plurality of databases 206(1)-206(*n*), and also to a plurality of client devices 208(1)-208(*n*) via communication network(s) 210. A communication interface of the APS device 202, such as the network interface 114 of the computer system 102 of FIG. 1, operatively couples and communicates between the APS device 202, the server devices 204(1)-204(*n*), and/or the client devices 208(1)-208(*n*), which are all coupled together by the communication network(s) 210, although other types and/or numbers of communication networks or systems with other types and/or numbers of connections and/or configurations to other devices and/or elements can also be used.

The communication network(s) 210 may be the same or similar to the network 122 as described with respect to FIG. 1, although the APS device 202, the server devices 204(1)-204(*n*), and/or the client devices 208(1)-208(*n*) may be coupled together via other topologies. Additionally, the network environment 10 may include other network devices such as one or more routers and/or switches, for example, which are well known in the art and thus will not be described herein. This technology provides a number of advantages including methods, non-transitory computer readable media, and APS devices that efficiently process client requests to automatically facilitate selection of a payment mode for purchase.

By way of example only, the communication network(s) 210 can include local area network(s) (LAN(s)) or wide area network(s) (WAN(s)), and can use TCP/IP over Ethernet and industry-standard protocols, although other types and/or numbers of protocols and/or communication networks can be used. The communication network(s) 202 in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The APS device 202 can be a standalone device or integrated with one or more other devices or apparatuses, such as one or more of the server devices 204(1)-204(*n*), for example. In one particular example, the APS device 202 can include or be hosted by one of the server devices 204(1)-204(*n*), and other arrangements are also possible. Moreover, one or more of the devices of the APS device 202 can be in a same or a different communication network including one or more public, private, or cloud networks, for example.

The plurality of server devices 204(1)-204(*n*) may be the same or similar to the computer system 102 or the computer device 120 as described with respect to FIG. 1, including any features or combination of features described with respect thereto. For example, any of the server devices 204(1)-204(*n*) may include, among other features, one or more processors, a memory, and a communication interface, which are coupled together by a bus or other communication link, although other numbers and/or types of network devices could be used. The server devices 204(1)-204(*n*) in this example may process requests received from the APS device 202 via the communication network(s) 210 according to the HTTP-based and/or JavaScript Object Notation (JSON) protocol, for example, although other protocols can also be used.

The server devices 204(1)-204(*n*) may be hardware or software or may represent a system with multiple servers in a pool, which may include internal or external networks. The server devices 204(1)-204(*n*) hosts the databases 206(1)-206 (*n*) that are configured to store financial account information which may include, by way of example, payment modes associated with a digital wallet and account parameters associated with the payment modes. Further, the databases 206(1)-206(*n*) may store rules associated with the account parameters.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204 (1)-204(*n*) may contain a plurality of network computing devices that operate using a master/slave approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. For example, the client devices 208 (1)-208(*n*) in this example may include any type of computing device that can facilitate the generation of price quote requests, such as in response to user interaction with graphical user interfaces for example. Accordingly, the client devices 208(1)-208(*n*) can be mobile computing devices, desktop computing devices, laptop computing devices, tablet computing devices, virtual machines (including cloud-based computers), or the like, that host chat, e-mail, or voice-to-text applications, for example.

The client devices 208(1)-208(*n*) may run interface applications, such as standard web browsers or standalone client applications, which may provide an interface to communicate with the APS device 202 via the communication network(s) 210 in order to communicate user requests. The client devices 208(1)-208(*n*) may further include, among other features, a display device, such as a display screen or touchscreen, and/or an input device, such as a keyboard, for example.

Although the exemplary network environment 200 with the APS device 202, the server devices 204(1)-204(*n*), the client devices 208(1)-208(*n*), and the communication network(s) 210 are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the APS device 202, the server devices 204(1)-204(*n*), or the client devices 208(1)-208(*n*), for example, may be configured to operate as virtual instances on the same physical machine. In other words, one or more of the APS devices 202, the server devices 204(1)-204(*n*), or the client devices 208(1)-208(*n*) may operate on the same physical device rather than as separate devices communicating through communication network(s) 210. Additionally, there may be more or fewer APS devices 202, server devices 204(1)-204(*n*), or client devices 208(1)-208 (*n*) than illustrated in FIG. 2.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
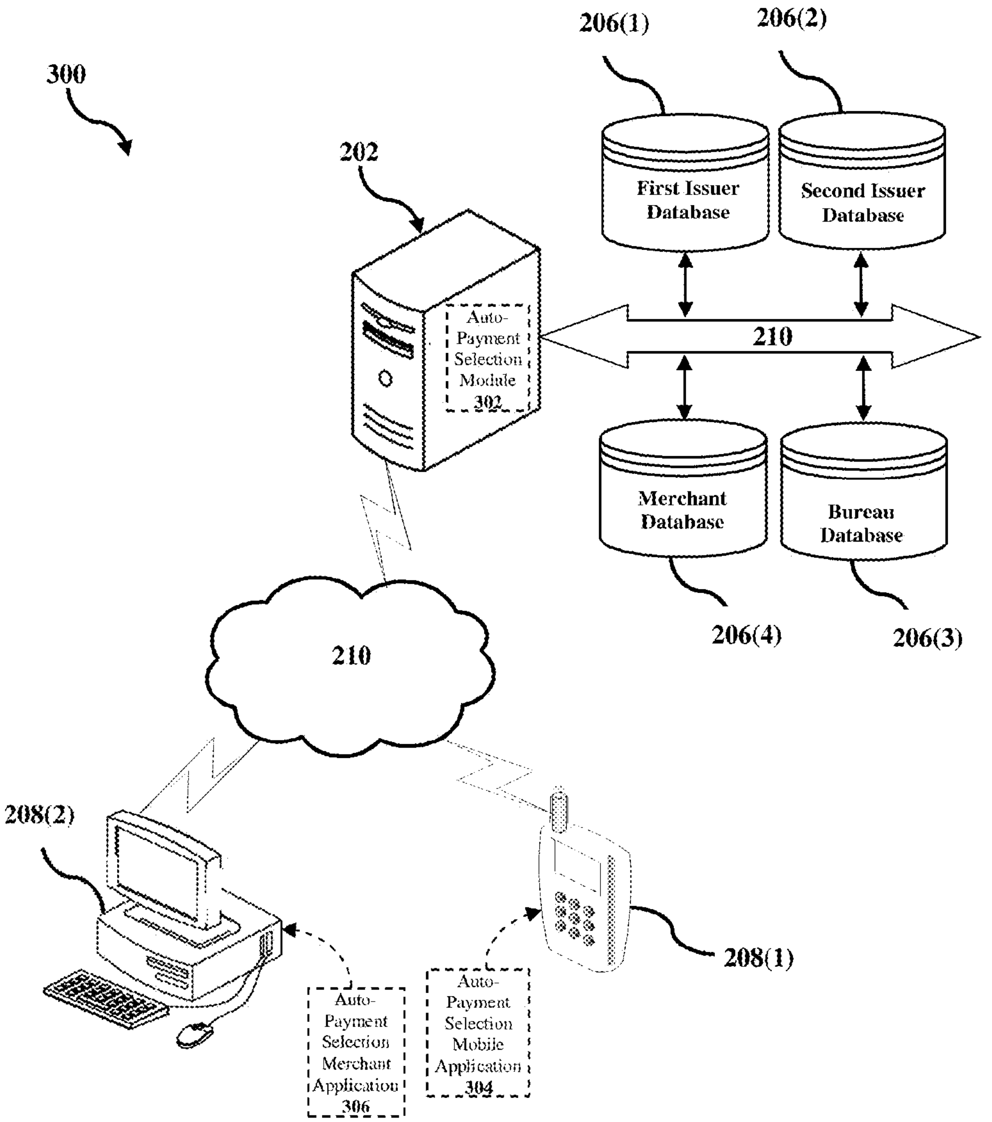
FIG. 3 shows an exemplary job description of a system for sourcing and recruiting candidates into an interview process.

The APS device 202 is described and shown in FIG. 3 as including an auto-payment selection module 302, although it can include other rules, policies, modules, databases, or applications, for example. As will be described below, the auto-payment selection module 32 is configured to facilitate selection of one of a plurality of transaction or payment modes based on user location information and user account information collected from the server devices 204(1)-204 (*n*). Based on the collected user account information, the auto-payment selection module 302 determines account parameters associated with the user accounts and/or transaction or payment modes, and assigns scores to the account parameters. The auto-payment selection module 302 analyzes the scores to recommend one of the transaction or payment modes to be utilized for a transaction. The auto-payment selection module 302 can utilize user location information and user account information to select a transaction or payment mode although other types of information, techniques, and methods can also be used.

Transaction or payment modes associated with a user's digital wallet may include, by way of example, credit card, debit card, bank accounts, and financial accounts. The account parameters may include, by way of example, credit card account information, debit card account information, bank account information, financial transactions, rewards associated with a bank account, financial charges associated with the payment modes, interest rates associated with the payment modes, credit score impact of the user based on the payment modes, revolver user identification, or transactor user identification. A revolver user is a credit card consumer who carries a balance from month to month, and a transactor is a credit cardholder who makes purchases with a credit card, but does not carry a balance and therefore pays no interest charges. Further, the rules stored in the databases 206(1)-206(*n*) may include, by way of example, analyzing interest rates between different payment modes, analyzing financial charges between different payment modes, analyzing rewards between different payment modes, although any of the account parameters for a payment mode may be also be analyzed.

An exemplary transaction 300 utilizing the network environment of FIG. 2 is shown as being conducted in FIG. 3. Specifically, a first client device 208(1) is shown as conducting a transaction with a second client device 208(2). In this regard, the first client device 208(1) and the second client device 208(2) may be "clients" of the APS device 202 and are described herein as such. Nevertheless, it is to be known and understood that the first client device 208(1) and/or the second client device 208(2) need not necessarily be "clients" of the APS device 202, or any entity described in association therewith herein. Any additional or alternative relationship may exist between either or both of the first client device 208(1) and the second client device 208(2) and the APS device 202, or no relationship may exist.

In the transaction, the first client device 208(1) may be a purchaser, and is referred to hereinafter as a purchase device 208(1), or also a user device, for convenience. The second client device 208(2) may be a merchant, and is referred to hereinafter as merchant device 208(2) for convenience. Nevertheless, it is to be known and understood that the terms "purchase" and "merchant" are not to be construed as limiting. The terms may encompass any descriptors which are known and understood in the art to describe parties to a transaction.

The purchase device 208(1) may be, for example, a smart phone. Of course, the purchase device 208(1) may be any additional device described herein. The merchant device 208(2) may be, for example, a point-of-sale (POS) terminal. Of course, the merchant device 208(2) may also be any additional device described herein.

The transaction may be conducted via the communication network(s) 210, which may comprise plural networks as described above. For example, in an exemplary embodiment, the purchase device 208(1), e.g., the smart phone, and the merchant device 208(2), e.g., the POS terminal, may conduct the transaction via near field communication, while either or both of the purchase device 208(1) and the merchant device 208(2) may communicate with the APS device 202 via broadband or cellular communication. Of course, these embodiments are merely exemplary and are not limiting or exhaustive.

Upon initiation of the transaction, an auto-payment selection module 302 is initiated. The auto-payment selection module 302 may comprise an executable program, software, or other application. The auto-payment selection module 302 may be provided by the APS device 202 to either or both of the purchase device 208(1) or the merchant device 208(2). While the auto-payment selection module 302 is described as being provided to the purchase device 208(1) in the immediately following embodiment of FIG. 3, a further embodiment will be described in which the auto-payment selection module 302 is provided to the merchant device 208(2) thereafter. Of course, it is to be understood that the embodiments may be provided in combination.

The auto-payment selection module 302 is shown in FIG. 3 as being located in the APS device 202. In this regard, the purchase device 208(1) may remotely access the auto-payment selection module 302, such as via the communication network(s) 210. In additional or alternative embodiments, the auto-payment selection module 302 may be partly or wholly located in the purchase device 208(1) such as, for example, by being downloaded to or installed in the purchase device 208(1). In such case in which the auto-payment selection module 302 is partly located in the purchase device 208(1), the purchase device 208(1) may be interpreted to include an auto-payment selection mobile application 304, as shown in FIG. 3. The auto-payment selection module 302 may further be partly or wholly located in the merchant device 208(2), as will be described in the further embodiment below. In such case in which the auto-payment selection module 302 is partly located in the merchant device 208(2), the merchant device 208(2) may be interpreted to include an auto-payment selection merchant application 306. In the following embodiments, the purchase device 208(1) and the merchant device 208(2) will be described as including the auto-payment selection mobile application 304 and the auto-payment selection merchant application 306, respectively. Nevertheless, it is to be known and understood that the features of the auto-payment selection module 302, also as described with respect to the auto-payment selection mobile application 304 and the auto-payment selection merchant application 306, may be included within any one or combination of the APS device 202, the purchase device 208(1), and the merchant device 208(2), and also interchangeably moved there among.

The auto-payment selection mobile application 304 may be manually started or executed upon initiation of the transaction, such as by a user of the purchase device 208(1). The auto-payment selection mobile application 304 may be manually started or executed by the user opening or otherwise activating the auto-payment selection mobile application 304. Additionally or alternatively, the auto-payment selection mobile application 304 may be manually started or executed by the user selecting or otherwise operating the auto-payment selection mobile application 304 within another application or program. For example, according to embodiments of the present disclosure, the purchase device 208(1) may include or have access to an electronic wallet which includes various modes of payment. The auto-payment selection mobile application 304 may be operated within the electronic wallet to select one of the modes of payment. Additionally or alternatively, the auto-payment selection module 302 may be operated by a user of the purchase device 208(1) externally of the electronic wallet to select one of the modes of payment. In even further embodiments, the auto-payment selection module 302 may comprise the electronic wallet.

As an alternative or in addition to being manually executable, the auto-payment selection mobile application 304 may be automatically started or executed. For example, the auto-payment selection mobile application 304 may be automatically started or executed upon initiation of the transaction via near filed communication between the purchase device 208(1) and the merchant device 208(2). As an additional example, the auto-payment selection mobile application 304 may be automatically started or executed upon the electronic wallet being opened. In an even further example, the auto-payment selection mobile application 304 may be automatically started or executed upon a product being scanned or electronically selected. In such example, the transaction need not relate to an actual transaction, but rather, a hypothetical transaction in which a user is provided with a selected payment mode or method of payment before actually transacting for the product. Accordingly, the user may make a more informed decision to purchase the product, based on deciding whether it is desirable to use the selected payment mode. In such embodiment, the user may physically scan the product in the real word, or electronically scan or select the product in an electronic environment, such as via a webpage. In a still further example, the auto-payment selection mobile application 304 may be automatically started or executed upon detecting proximity to the merchant device 208(2). The proximity may be detected by the merchant device 208(2) emitting a signal or via other known and understood methods.

Upon being started, the auto-payment selection mobile application 304 and/or the auto-payment selection module 302, individually or in combination, execute a process for selecting a payment mode. An exemplary process for selecting a payment mode is generally indicated at 400 in FIG. 4. For convenience, the process 400 is described as being performed by the auto-payment selection mobile application 304 of the purchase device 208(1) and the auto-payment selection module 302 of the APS device 202 in combination. Although, it is to be known and understood that the process 400 may be performed by either of the purchase device 208(1) or the APS device 202 without inclusion of the other. The process 400 may be performed by the purchase device 208(1) or the APS device 202 individually, or in concert with another device such as, but not limited to, the merchant device 208(2).

Figure 4:
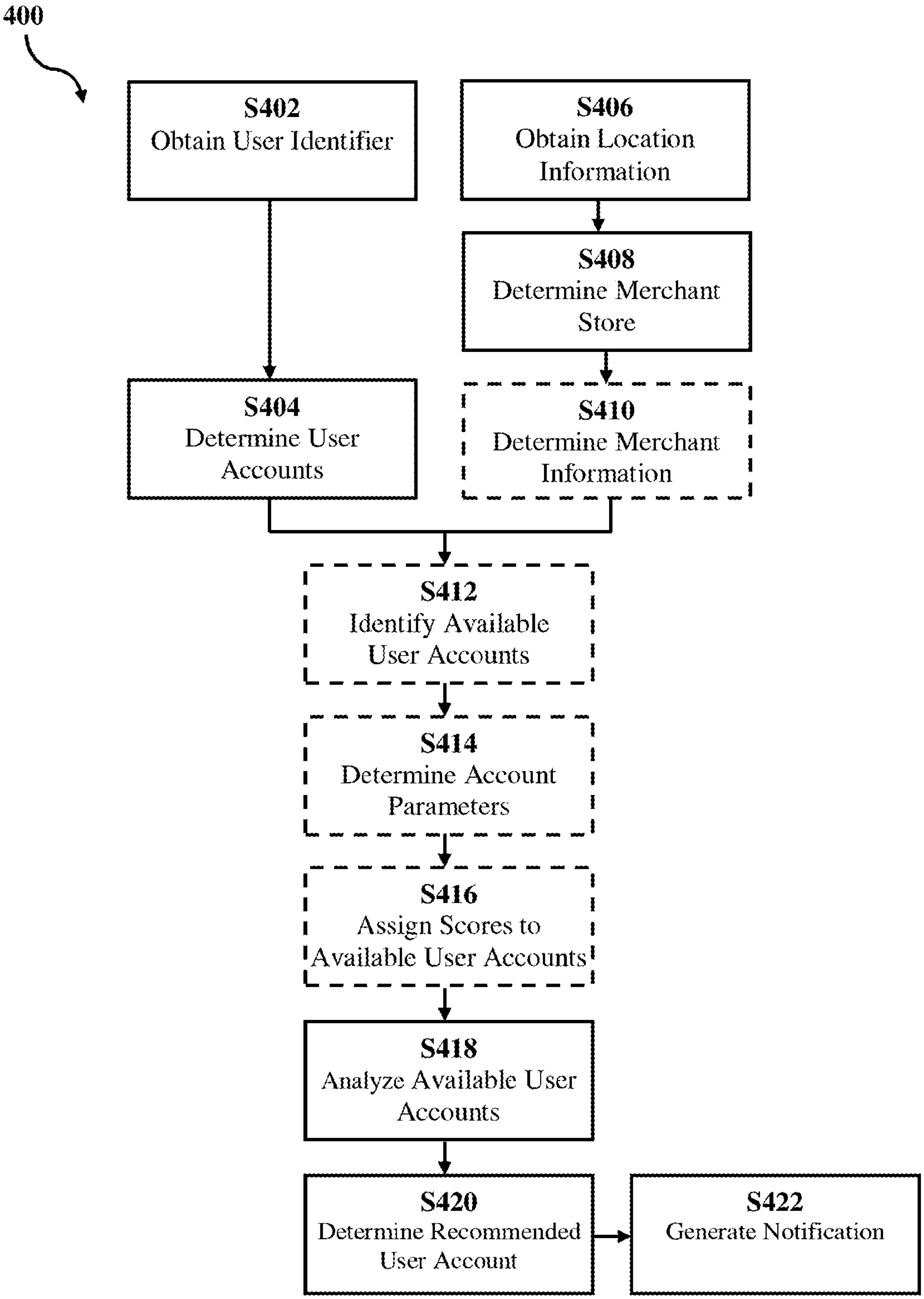
FIG. 4 is a flowchart of an exemplary process for facilitating selection of a transaction mode.

In the process 400 of FIG. 4, user identification information is obtained at step S402. The user identification information includes information which identifies the user of the purchase device 208(1), with the purchase device 208(1) performing the electronic transaction. The user identification information may include any information or identifier which is known and understood in the art to identify a user.

A plurality of user accounts of the user is determined based on the user identification information at step S404. The user accounts may be stored or saved in, or in association with, the auto-payment selection module 302 or the auto-payment selection mobile application 304 prior to the user identification information being obtained at step S402. For example, the auto-payment selection module 302 or the auto-payment selection mobile application 304 may be associated with an electronic wallet of the user. In this regard, the user may load, register, or otherwise add each of the user accounts into the electronic wallet. Additionally or alternatively, the user accounts may be determined independently of any user input before or after the user identification information is obtained at step S402. For example, in an embodiment in which the APS device 202 is or is associated with an issuer or institution, the ABS device 202 may determine the user accounts by means of the server devices 204(1)-204(*n*). The ABS device 202 may determine each of the user accounts by means of a first issuer database 206(1), which is its own database. In further embodiments, the ABS device 202 may additionally or alternatively determine the user accounts by means of a second issuer database 206(2), which is unassociated therewith. In such embodiments, an application programming interface may be required to gain access to the second issuer database 206(2). In even further embodiments, the ABS device 202 may be neither an issuer nor an institution, and the ABS device 202 may determine the user accounts by means of the first issuer database 206(1) and the second issuer database 206(2), which are each unassociated therewith. Of course, the above described embodiments are merely exemplary and are not limiting or exhaustive. The user accounts may be determined in accordance with any known and understood methods without departing from the scope of the present disclosure. For example, the user accounts may additionally or alternatively be determined via any credit bureau database 206(3), any merchant database 206(4), or any other credit or other reporting agency (not shown).

Location information is obtained at step S406 of the process 400. The location information may be determined by the purchase device 208(1) and transmitted to the APS device 202 via the communication network(s) 210. The location information may be transmitted together with or separately from the user identification information. The location information may comprise positioning information, such as GPS information that is determined by a global positioning satellite device included in the purchase device 208(1). The positioning information may include latitude, longitude, altitude, and/or any additional or alternative measurement of position. The positioning information may comprise a measurement at a single point in time, such as a coordinate, or a position-trace measured over a predetermined period of time. Again, the positioning information may comprise any information which is known and understood in the art without departing from the scope of the present disclosure.

A merchant is determined based on the location information of the purchase device 208(1) at step S408. In this regard, the APS device 202 is attempting to determine the merchant of the merchant device 208(2) with which the purchase device 208(1) of the user is conducting the transaction. The APS device 202 may determine the merchant by using a map, table, database, or other resource in association with the location information of the purchase device 208(1). That is, the APS device 202 may determine the merchant by the location of the purchase device 208(1) being in proximity to the purchase device 208(1). The merchant may be determined as the closest merchant to the purchase device 208(1), or the merchant may be determined as any merchants within a predetermined distance of the purchase device 208(1). The merchant may further be determined in accordance with additional rules or criteria, such as being co-located at the position of the purchase device 208(1).

In an embodiment in which the APS device 202 is unable to specifically determine the merchant from the location information at step S408, the APS device 202 may generate and transmit a list of co-located or otherwise-identified merchants, which are each identified based on the location information of the purchase device 208(1). In such embodiment, the user may be requested or provided an opportunity to select one of a plurality of identified merchants. Upon receiving a selection from the user, the selected merchant is determined to be the merchant at step S408. If the user fails to select one of the identified merchants within a predetermined time period, or instead of requesting the user to select a merchant altogether, the APS device 202 may automatically select one of the merchants to be the merchant at step S408. The APS device 202 may select one of the merchants based on predetermined criteria including, but not limited to, a most recent merchant with whom a transaction was conducted by the user, a most frequent merchant with whom transactions are conducted by the user, a largest merchant in terms of square footage, a largest merchant in terms of sales volume, or any other criteria which is generally known and understood in the art. Alternatively to selecting one of the merchants, the APS device 202 may proceed in step S410 and hereinafter use common characteristics amongst all of the merchants, a majority of the merchants, or any other criteria which is shared amongst a group of the merchants. As will be discussed below, the common characteristics of all or the subset of merchants may include common modes of transaction or payment which are accepted by the merchants. In even further embodiments, the process may be ended and a default user account recommended.

In further embodiments in which the APS device 202 is unable to specifically determine the merchant at step S408 based on the GPS information, additional information may have been received as the location information in step S406, which may further be used to determine the merchant. For example, sound information may be detected by a microphone of the purchase device 208(1) to assist in determining the merchant. The sound information may be filtered to identify predetermined sounds which are commonly associated with certain stores. For example, a sound of an espresso machine may be identified to select a coffee shop from amongst a plurality of other merchants. As an additional example, background music may be identified to distinguish a retail or clothing store from a grocery store. In even further embodiments, speech may be identified to discern the merchant from among the plurality of merchants. Such embodiments may even filter the speech to that of a specific user, such as the user of the purchase device 208(1). In such embodiment, the user may be trained to instinctively speak the name of the merchant with whom the transaction is being detected, such that the user is not required to physically input the merchant to the device. Of course, the above-described embodiments are merely exemplary and are not limiting or exhaustive.

In even further embodiments of the process 400, as discussed above, the positioning information of the purchase device 208(1) may include a position-trace measured over a predetermined period of time. That is, the position-trace may comprise positions of the purchase device 208(1), measured at each of regular or irregular intervals over the predetermined period of time. When the APS device 202 is unable to specifically determine the merchant at step S408 based on the positioning information, at a single time alone, the APS device 202 may use the position-trace. Specifically, the APS device 202 may select a merchant from among a plurality of merchants based on a number of changes in direction in the position-trace. In this regard, in the event of a coffee shop being located within a grocery store and undiscernible based on location, a user is likely to walk directly to the coffee shop to conduct a transaction therewith. In contrast, prior to conducting a transaction with the grocery store, the user is likely to wander through the aisles thereof. As an additional example, a user is likely to walk directly to a kiosk or eatery in a shopping mall, while the user is likely to meander through a retail store. Accordingly, closely or co-located merchants may be distinguished by the position-trace using, for example, a number of changes in direction or a direct or indirect path to the merchant. The above-examples are again merely exemplary, and the position-trace may be used in accordance with additional criteria or information in additional or alternative embodiments of the present disclosure In even further additional or alternative embodiments of the process 400, the location information may include additional information which is obtained or detected by the purchase device 208(1). For example, light information may be obtained by a camera of the purchase device 208(1). The light information may include, but is not limited to, image or video information, an amount of ambient light, or any additional information which is known and understood in the art. The light information may be used to determine the merchant in step S408, or the light information may additionally or alternatively be used as will be described below.

In even further embodiments of the process 400, the merchant may even be further determined in accordance with additional or alternative methods. For example, the merchant may be determined based on information received from the purchase device 208(1) and/or the merchant device 208(2). Specifically, if the transaction is performed via near field communication, the purchase device 208(1) may determine the merchant from the merchant device 208(2). In such case, the APS device 202 may obtain the merchant from the purchase device 208(1).

In an embodiment of the process 400, upon determining the merchant, information of the merchant may be determined at step S410. The information of the merchant may include, for example, accepted transaction modes of the merchant. The accepted transaction modes include, for example, accepted methods of payment. The accepted transaction modes may be obtained directly from the merchant, such as via data received from the merchant and stored in a database in association with the merchant or on a webpage of the merchant. Such data may be obtained from one of the databases 206(1)-206(*n*) corresponding to the merchant. Additionally or alternatively, the accepted transaction modes may be obtained by other means, such as via electronic reviews. In any event, the accepted transaction modes of the merchant may be obtained by any means known and understood in the art without departing from the scope of the present disclosure.

In embodiments in which the accepted transaction modes of the merchant are received at step S410, available user accounts from among the plurality of user accounts determined at step S404 may be identified at S412. That is, accounts of the user accounts that do not correspond to the accepted transaction modes of the merchant may be excluded from selection when determining the recommend transaction mode. For example, if the merchant does not accept payment from a specific credit card issuer or payment source, such credit card and payment source may be excluded, or disregarded, from the possible user accounts determined at S404. According to such feature, the APS device 202 need not unnecessarily analyze such credit card and payment source accounts, thereby improving upon the processing capability of the APS device 202 and reducing memory and other resource usage.

For each of the user accounts which is determined based on the user identification information at step S404, or for each of the available user accounts which is determined to not be excluded from among the user accounts at step S412, at least one account parameter is determined at step S414. The account parameters may include any one or combination of the following: a credit limit associated with an account; an outstanding balance associated with an account; an available balance associated with an account; a reward associated with an account; finance charges associated with an account; interest charges associated with an account; and credit score impact associated with an account. Of course, these parameters are merely exemplary and may additionally or alternatively include any parameters described herein or otherwise known and understood in the art. The account parameters may be determined from the plurality of server devices 204(1)-204(*n*), as described with respect to the manner in which the user accounts are determined at step S404.

The account parameters may be specific to the user account, or the account parameters may be additionally or alternatively be related to the merchant determined at step S408. For example, upon determining the merchant at S408, the information of the merchant at step S410 may include a merchant-defined parameter associated with a transaction mode. The merchant-defined parameter may be stored in and retrieved from one of the databases 206(1)-206(*n*). Should one of the user accounts correspond to the transaction mode, the merchant-defined parameter may be associated or determined for the corresponding user account. That is, the merchant determined at S408 may offer a rebate, reward, or other incentive to complete the transaction with a credit card from a specific issuer. If one of the user accounts of the user relates to a credit card from the specific issuer, the merchant-defined parameter may be set up to that user account. According to such feature, the merchant may incentivize the user to use a particular transaction mode. The user may or may not be made aware of the particular incentive.

At step S416, scores may be assigned to each of the user accounts, or available user accounts, based on the account parameters, and also based on the merchant-defined parameter if applicable. The scores may be determined based on rules or criteria defined by the APS device 202, and/or the scores may be assigned to the user accounts based on rules or criteria set by the user. In embodiments of the present application, the scores may be based on a rule or criterion which relates to a single parameter. For example, if the user wants to buy a house and improve his or her credit score, the scores may be assigned to the user accounts solely to improve his or her credit score. In further embodiments, the scores may be based on a rule or criterion which relates to multiple parameters. For example, if the user wants to maximize income, the scores may be assigned to the user accounts such that any financial benefit or reward is offset by any finance or interest charges. Of course, the above-described examples are merely exemplary and not limiting. Additional methods of assigning scores as described herein, and also as generally known and understood in the art, may be employed without departing from the scope of the present disclosure.

The user accounts and scores assigned thereto may be analyzed at step S418, in order to determine a recommended user account from among the user accounts at step S420. The recommended user account may be determined solely based on the scores assigned thereto. The recommended user account may be determined, for example, to maximize the rules or criteria upon which the scores are assigned. In this regard, a single recommend user account may be determined and provided to the user, or plural recommended user accounts may be determined and provided to the user. The plural recommend user accounts may be determined on a priority basis, or the plural recommend user accounts may be determined based on plural rules or criteria. The recommend user account(s) may be determined by having a highest score or in accordance with any additional manner which is known and understood in the art.

In embodiments of the process 400, the recommended user account may further be determined based on additional information, such as the location information of the purchase device 208(1). For example, a user account may be de-prioritized or excluded from being selected as the recommended user account based on the location information of the purchase device 208(1). According to such embodiments, the user may limit or restrict certain user accounts from being used in certain areas such as, for example, foreign jurisdictions. Of course, the opposite is also true. That is, a user account may be prioritized or recommended based on the location information of the purchase device 208(1). According to such embodiments, certain user accounts may be encouraged to be used in certain areas.

After determining the recommended user account from among the user accounts at step S420, a notification is generated at step S420. The notification is configured to be displayed on the purchase device 208(1), and may be transmitted to the purchase device 208(1) via the communication network(s) 210. The notification is further configured to be used to complete the electronic transaction using the recommended user account. For example, the notification may include a QR code or a barcode that, when scanned, is configured to complete the electronic transaction using the recommended user account. In the event multiple, plural recommended user accounts are determined and provided, plural notifications may be generated. The plural notifications may be simultaneously displayed, or displayed in sequence, series, or other order. Alternatively, a signal notification may be generated only upon one of the plural recommended user accounts being selected by the user.

As an alternative to the embodiment of the process 400 described above, the process 400 may further include an embodiment in which the auto-payment selection merchant application 306 is included in the merchant device 208(2). In such alternative embodiment, the merchant device 208(2) may obtain the user identification information at step S402. The merchant device 208(2) may obtain the user identification information when, for example, a loyalty or reward card of the user is scanned or otherwise presented to the merchant device 208(2). As a further example, the merchant device 208(2) may include a camera which includes facial recognition technology or a biometric scanner which obtained the user identification information. The user identification information may thereafter be obtained by the APS device 202 together with the location information or identification information of the merchant at any combination of steps S402, S406, and S405. In such embodiment, the APS device 202 may still determine the user accounts at S404 and determine a recommend user account in the remaining steps, as described with respect to the above-embodiment. Accordingly, in such alternative embodiment, the merchant may provide a service to the user of recommending a preferred or advantageous account, or the merchant may incentivize the user to use a desirable account.

Figure 5:
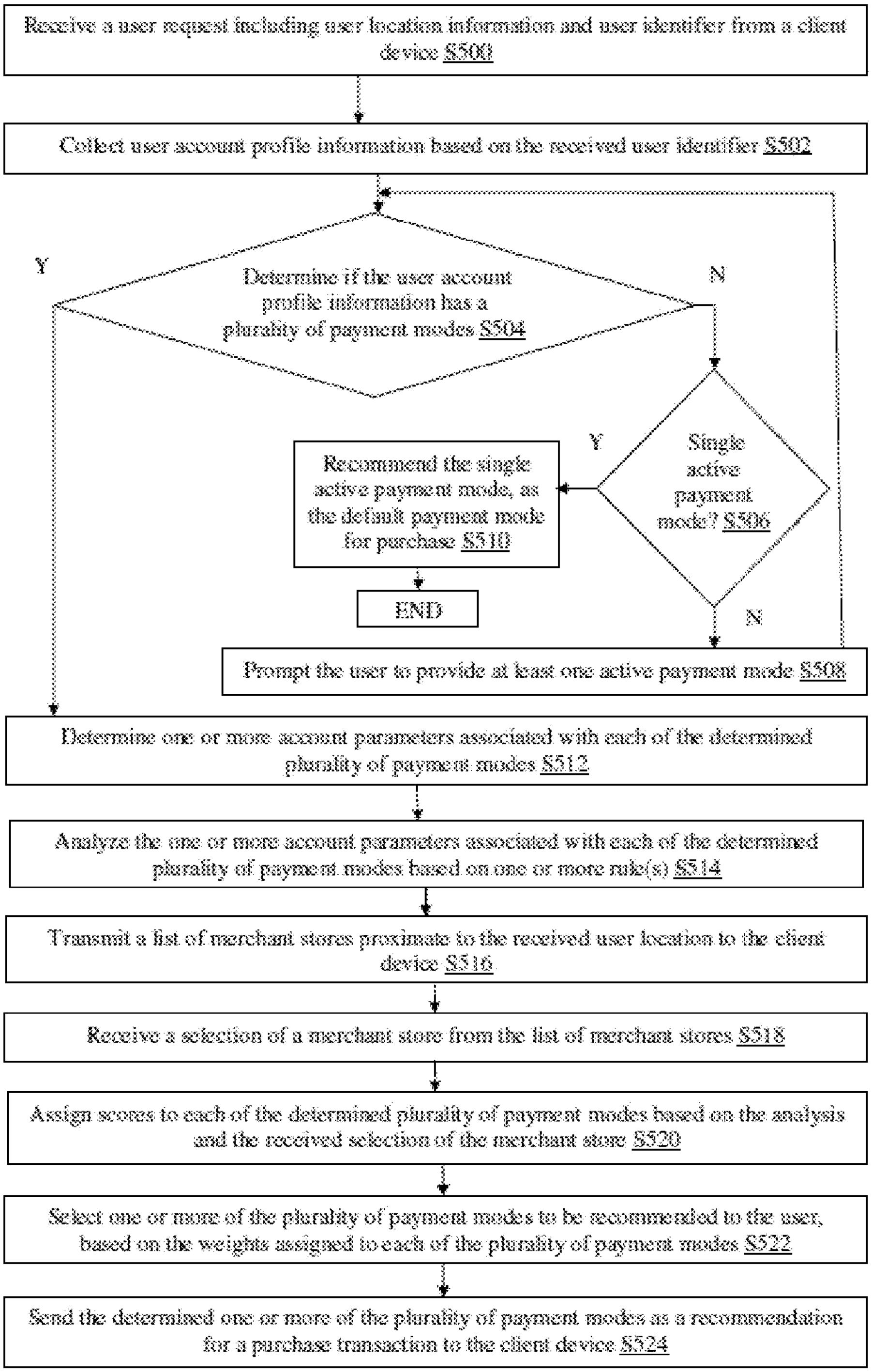
FIG. 5 is a flowchart of an additional exemplary process for facilitating selection of a transaction mode.

A further exemplary process of providing systematic intelligence for selecting a transaction or payment mode will now be described with reference to FIG. 5. In step S500 in this example, the APS device 202 receives a user request including merchant location information and user identification information, including a user identifier, from one of a plurality of client devices 208(1)-208($n$) which in this particular example will be the purchase device 208(1). The user of the purchase device 208(1) opens an auto-payment selection mobile application 600 shown in FIG. 4. The auto-payment selection mobile application 600 is a mobile application stored in the purchase device 208(1). In this example, the auto-payment selection mobile application 302 is the auto-payment selection mobile application 600. The auto-payment selection mobile application 600 can be a mobile payment wallet application to make purchases at a merchant point of sale terminal. The auto-payment selection mobile application 600 determines a current location of the purchase device 208(1) by using a GPS transmitter and receiver of the purchase device 208(1), although any other type of technology can be used to determine the location. The auto-payment selection mobile application 600 transmits the determined location information and the user identification information (such as user credentials and username which is obtained when the user accesses the mobile application wallet by way of example only) associated with the auto-payment selection mobile application 600 to the APS device 202. If the auto-payment selection mobile application 600 cannot determine the location of the purchase device 208(1), then the auto-payment selection mobile application 600 may transmit the last determined location of the purchase device 208(1), although other manners for obtaining the location may be used.

In step S502, the APS device 202 upon receiving the user request, reads the databases 206(1)-206(*n*) hosted by the server devices 204(1)-204(*n*) to collect user account profile information associated with the received user identification information. The user account profile information stored at the databases 206(1)-206(*n*) includes, by way of example only, a user account associated with the user identification information and a number of payment modes associated with a user's account, although other types and/or amounts of information associated with a user's account can also be collected. By way of example, the plurality of payment modes can include credit cards, debit cards and/or bank account information; although any other types and/or numbers of financial accounts can be included in the transaction or payment modes.

In step S504, the APS device 202 determines if the collected user account profile information associated with the received user identification information of the user request includes a plurality of transaction or payment modes. If in step S504 the APS device 202 determines that the collected user account profile information does not include a plurality of transaction or payment modes, then the No branch is taken to step S506.

In step S506, the APS device 202 determines if the user account profile information includes a single active payment mode. A single active payment mode can include, by way of example only, valid and active credit or debit card information. If in step S506 the APS device 202 determines that the user account profile information includes a single active payment mode, then the Yes branch is taken to step S510. In step S510, the APS device 202 recommends the determined single active payment mode, as the default payment mode for a purchase transaction to the user. The recommendation is provided as a notification on the user interface of the auto-payment selection mobile application 600 of the purchase device 208(1). The notification includes a QR code or a barcode used for making a purchase, although any other types of notification can be included. The user of the purchase device 208(1) can scan the QR code at a point of sale terminal to make a payment to complete a purchase. The QR code includes encrypted payment information of the single active payment mode. The payment information can include available credit associated with the single active payment mode to make a purchase although any other types of payment information can be included.

If back in step S506, the APS device 202 determines the user account profile information does not include a single active payment mode, then the No branch is taken to step S508. In step S508, the APS device 202 sends a prompt to the purchase device 208(1), prompting the user to provide at least one active payment mode. Further, the APS device 202 may receive from the purchase device 208(1) one or more newly recorded transaction or payment modes in step S508. The payment mode can include for example a credit card number, a debit card number, and/or a bank account number although other types and/or amounts of financial information associated with a financial account can be provided. Upon receiving the one or more transaction or payment modes, the method may proceed back to step S504 as explained above.

If back in step S504, the APS device 202 determines the collected user account profile information has a plurality of transaction or payment modes, then the Yes branch is taken to step S512. In step S512, the APS device 202 may read one or more databases 206(1)-206(*n*) hosted by the server device 204(1)-204(*n*) to determine one or more account parameters associated with the determined plurality of transaction or payment modes. By way of example, the plurality of transaction or payment modes in this example may include a credit card A, a credit card B and a credit card C. The one or more account parameters associated with the determined plurality of transaction or payment modes may include, by way of example only, credit card account information, debit card account information, and bank account information, although other types and/or numbers of account parameters can be used.

Further, the credit card account information may include a credit card number associated with a credit card account, available credit associated with that credit card account, rewards associated with that credit card account, financial charges associated with that credit card account, interest rate associated with that credit card account, previous transactions associated with that credit card account, and a credit score impact based on purchases made for that credit card account based on a determination of the credit card holder to be a revolver or a transactor.

The available credit for a credit card account includes an available credit limit associated with that credit card account. By way of example, for a credit card account that has a credit limit of $10,000, and the credit card holder has made purchases worth $6,000 then the available credit limit now is $4,000 with an outstanding payment to be made of $6,000.

The rewards associated with a credit card account may include for example that use of a credit card account to make purchases at a merchant store would result in a reward of 5% cashback to the credit card account and further using the credit card account to make purchases at another merchant store would result in a reward of 10% cashback to the credit card account, although other types and/or amounts of rewards may be provided.

The financial charges associated with a credit card account may include by way of example, an annual fee of $100 for using a credit card and/or transaction fees associated with each transaction by using a credit card, although other types and/or numbers of other financial charges may be included.

The interest rate associated with a credit card account may include a credit card account charging 3% interest per month on the outstanding payments to be made on the credit card account.

Previous transactions associated with a credit card account may include a list of all the transactions for a fixed time period, by way of example, in the past 12 months made using that credit card account, although any other number of time period may be included.

The credit score impact may be a determination made by the APS device 202 or another credit scoring system based on the current credit score of the credit card holder and how the current credit score would change based on future purchases using a credit card account. A high credit score is considered beneficial for a credit card holder a low credit score is considered unfavorable for the credit card holder.

In one example, the APS device 202 may analyze the previous transactions history for a credit card account and determine that the credit card holder is a revolver (A revolver is a credit cardholder who carries a balance from month to month and thus paying interest on the balance every month) and the current available credit limit for a credit card account is almost reaching the maximum available credit limit. As a result, the APS device 202 may determine that any further purchases using this credit card account would result in the current credit score going below a set threshold and thus would determine that the credit score impact is negative.

In another example, the APS device 202 may analyze the previous transactions history for a credit card account and determine that the credit card holder is a transactor (a transactor is a credit cardholder who makes purchases with a credit card, but does not carry a balance and therefore pays no interest charges) and that current available credit limit for this credit card account is below the maximum available credit limit. As a result, the APS device 202 may determine that any further purchases using this credit card account would result in the current credit score going higher and thus would determine that the credit score impact is positive.

Further, the debit card account information may include a debit card number associated with a debit card account, available account balance associated with that debit card account, rewards associated with that debit card account, financial charges associated with transactions for that debit card account, and interest rate associated with that debit card account by way of example.

Further, the bank account information may include a bank account number associated with a bank account, available account balance associated with that bank account, rewards associated with that bank account, financial charges associated with transactions for that bank account.

In step S514, the APS device 202 may analyze the collected one or more account parameters associated with each of the determined plurality of transaction or payment modes based on one or more rules. In this example, the plurality of transaction or payment modes includes credit card A, credit card B and credit card C. The one or more rules may include, by of example only, a rule to perform an analysis of available credit limit associated with each of the credit card A, credit card B and credit card C to determine the highest available credit limit. The available credit limits associated with each of the credit card A, credit card B, and credit card C is collected in step S512.

In this example, the available credit limit associated with credit card A is $5,000 and the available credit limit associated with credit card B is $5,000 and the available credit limit associated with credit card C is $1,000. The APS device 202 analyzes the available credit limit associated with each of the credit card A, credit card B, and credit card C to determine that credit card A and credit card B to have the highest available credit limit and the method proceeds to step S516.

The one or more rules may also include, by of example only, a rule to: analyze financial charges associated with each of the credit card A, credit card B and credit card C to determine the lowest financial charge; to analyze rewards associated with each of the credit card A, credit card B and credit card C to determine the highest rewards; to analyze the interest rates associated with each of the credit card A, credit card B and credit card C to determine the lowest interest rate; and to perform an analysis of the credit score impact associated with each of the credit card A, credit card B and credit card C to determine the highest credit score impact, although other types and/or numbers of rules may be used.

In another example, in step S514 when the available credit limit associated with credit card A is $8,000 and the available credit limit associated with credit card B is $5,000 and the available credit limit associated with credit card C is $1,000. The APS device 202 analyzes the available credit limit associated with each of credit card A, credit card B and credit card C and in this example determine that credit card A has the highest available credit limit and then in this alternative example proceeds to step S516.

In step S516, the APS device 202 utilizes the received user location information to determine a list of merchant stores that are within a predetermined distance from the received user location information of the purchase device 208(1). The APS device 202 accesses the databases 206(1)-206(*n*) hosted at the server devices 204(1)-204(*n*) that stores locations for a plurality of merchant stores. Based on the accessed stored locations for the plurality of merchant stores, the APS device 202 determines a list of merchant stores that are within a distance of 0.5 miles, for example, from the received user location information, although any other distance can also be included. The APS device 202 then transmits the list of merchant stores that are within the predetermined distance of 0.5 miles from the determined location as a drop down to the purchase device 208(1).

In step S518, the APS device 202 receives a selection of a merchant store from the list of merchant stores from the purchase device 208(1). The APS device 202 then may store the received selection of the merchant store from the list of merchant stores in the memory which in this particular example will be merchant store A.

In step S520, the APS device 202 assigns scores to each of the determined plurality of transaction or payment modes based on the analysis performed and the stored selection of one or more merchant stores which again in this particular example will be merchant store A. The APS device 202 determines the type of payment that is accepted by the merchant store A by accessing the databases 206(1)-206(*n*) hosted at the server devices 204(1)-204(*n*) that stores type of payments accepted by each of the plurality of merchant stores. By way of example, merchant store A accepts, credit card A and credit card C and does not accept credit card B.

Based on the analysis in step S514 and the location, the APS device 202 assigns a score to each of the credit card A, credit card B and credit card C. The APS device 202 assigns the credit card A as the highest score with a rank of 1 as the credit card A is accepted at the merchant store A and also as credit card A was determined to have the highest available credit limit of $5,000 in step S514. The APS device 202 then assigns credit card C a second rank, as credit card C is an acceptable credit card at the merchant store A and further was determined to have an available credit limit of $1,000 in step S514 which is second highest available credit limit. Further, the APS device 202 then assigns the credit card B a third rank, as credit card B is the only credit card which is not acceptable at the merchant store A from the credit card A, credit card B, and credit card C. Any type and number of techniques can be used to assign scores to each of the plurality of transaction or payment modes used based on user preferences.

In another example, when the available credit limit associated with credit card A is $8,000 and the available credit limit associated with credit card B is $5,000 and the available credit limit associated with credit card C is $1,000, the APS device 202 assigns each of the credit card A, credit card B and credit card C a score. The APS device 202 assigns the credit card A as the highest score with a rank of 1 as the credit card A is accepted at the merchant store A and also as credit card A was determined to have the highest available credit limit of $8,000 in step S514. The APS device 202 then assigns credit card C a second rank, as credit card C is an acceptable credit card at the merchant store A and further was determined to have an available credit limit of $1,000 in step S514 which is second highest available credit limit. Further, the APS device 202 then assigns the credit card B a third rank, as credit card B is the only credit card which not acceptable at the merchant store A from the credit card A, credit card B and credit card C. Any type and number of techniques can be used to assign scores to each of the plurality of transaction or payment modes used based on user preferences.

In step S522, the APS device 202 selects one or more of the plurality of transaction or payment modes to be recommended to the user, based on the score assigned to each of the plurality of transaction or payment modes in step S516. In the above example, based on the assigned scores, credit card A would have the highest rank, followed by credit card C. Further, the credit card B would not be recommended by the APS device 202. The APS device 202 would recommends the credit cards based on this ranked order, although types and/or number of techniques can be used to recommend one or more of the plurality of transaction or payment modes.

In step S524, the APS device 202 sends the selected one or more of the plurality of transaction or payment modes as a recommendation for a purchase transaction to the purchase device 208(1). The purchase device receives the recommended one or more plurality of transaction or payment modes which may be displayed to the user of the purchase device to be viewed, selected, and used continue with the purchase at the checkout of the point of sale terminal. The recommendation is provided as a notification on the user interface of the auto-payment selection mobile application 600 of the purchase device 208(1). The notification includes a QR code or a barcode used for making a purchase, although any other types of notification can be included. The user of the purchase device 208(1) can scan the QR code at a point of sale terminal to make a payment to complete a purchase. The QR code includes encrypted payment information of the single active payment mode. The payment information can include available credit limit associated with the single active payment mode to make a purchase although any other types of payment information can be included.

In another example, back in step S502, the user account profile information collected by the APS device 202 includes, by way of example only, predefined scores associated with each of the plurality of transaction or payment modes. The predefined scores associated with each of the plurality of transaction or payment modes may be previously stored at the databases 206(1)-206(*n*) by a user of the account. The user, based on their own preferences, may assign scores to each of the plurality of transaction or payment modes. In this example, the plurality of transaction or payment modes in this example, may include a credit card A, a credit card B, and a credit card C. Further, by way of example, the predefined scores associated with the plurality of transaction or payment modes may include credit card C assigned the highest score with a rank of 1, credit card B assigned the next highest score with a rank of 2, and the credit card A assigned with the lowest score with a rank of 3.

In this example, back in step S520 after the APS device 202 assigns scores to the plurality of transaction or payment modes based on the predefined scores associated with each of the plurality of transaction or payment modes set by the user. In this example, the predefined scores associated with the plurality of transaction or payment modes includes, credit card C assigned the highest score with rank of 1, the credit card B assigned a highest score of rank 2 and the credit card A assigned the lowest score with a rank of 3. The APS device 202 scores each of the plurality of transaction or payment modes to order the credit card C with a rank 1 and credit card A with a rank 2 and credit card B with a rank 3 based on the predefined scores associated with each of the plurality of transaction or payment modes.

In this example, in step S520 the APS device 202 assigns scores to the plurality transaction or payment modes based on comparing an account parameter with one or more other account parameters. In this example, for the account parameters of available credit limit and credit score impact associated with each of the credit card A, credit card B and credit card C, the APS device 202 performs a comparison of the account parameter of available credit limit associated with each of the credit card A, credit card B and credit card C with the account parameters of credit score impact associated with each of the credit card A, credit card B and credit card C.

In another example, back in step S502, the user account profile information collected by the APS device 202 includes, by way of example only, predefined scores associated with a plurality of account parameters. The predefined scores associated with each of the plurality of account parameters may be previously stored at the databases 206(1)-206(*n*) by a user of the account. The user based on their own preferences would assign scores to each of the plurality of account parameters. In this example, the plurality of account parameters in this example, includes available credit limit associated with each of the plurality of transaction or payment modes, financial charges associated with each of the plurality of transaction or payment modes and credit score impact associated with each of the plurality of transaction or payment modes. Further, by way of example, the predefined scores associated with the plurality of account parameters includes, available credit limit account parameter to be assigned the lowest score with a rank of 3, a financial charges account parameter is assigned the highest rank of 1 and a credit score impact is assigned a rank of 2, although any number of account parameters may be assigned predefined scores. In this example, back in step S514 the APS device 202 only analyzes the account parameters of available credit limit, financial charges and credit score impact for each of the credit card A, credit card B and credit card C and does not analyze the any other account parameters.

Figure 6:
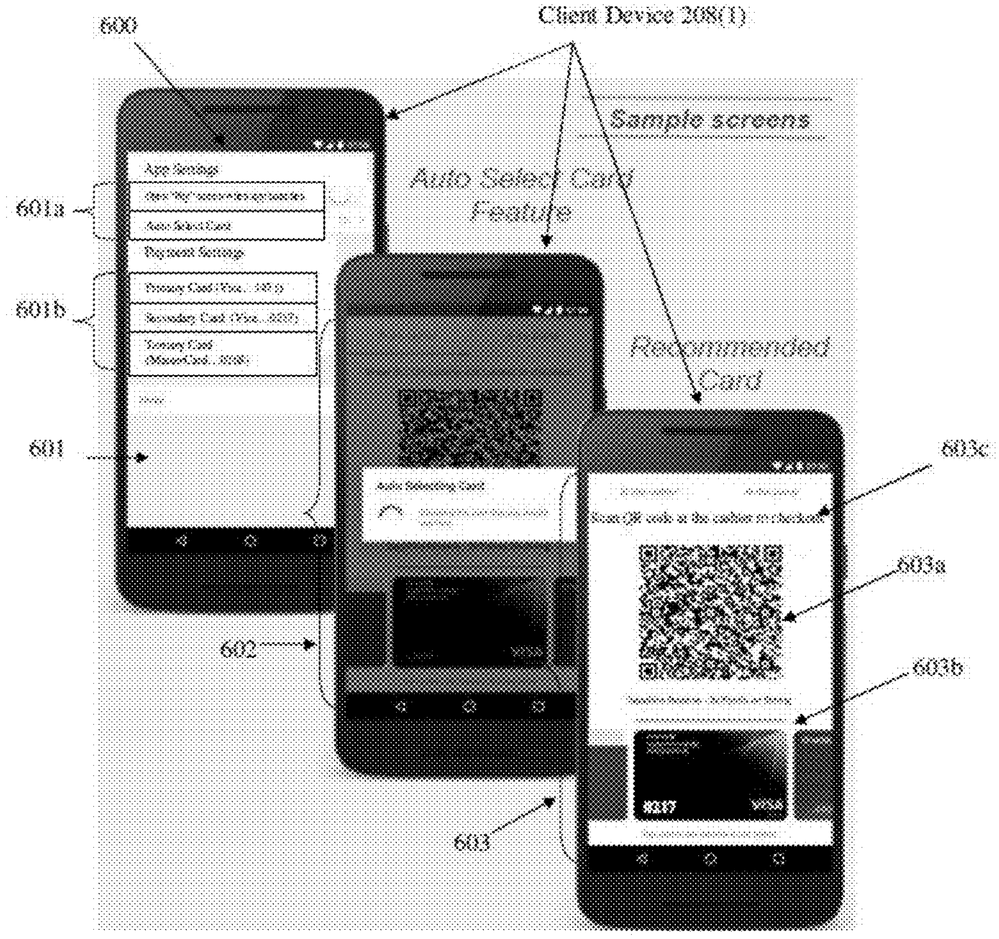
FIG. 6 shows exemplary screenshots of a process for facilitating selection of a transaction mode.

FIG. 6 shows an example of the user interface of the auto-payment selection mobile application 600 that receives a recommendation of a payment mode from a transaction or payment of payment modes. The user interface 601 displays a "Payment Settings" option that includes a transaction or payment of payment modes 601*b*. In this example, the plurality of transaction or payment modes 601*b* include a first credit card (Visa . . . 1471), a second credit card (Visa . . . 0217) and a third credit card (MasterCard . . . 0268). Further, each of the plurality of transaction or payment modes is assigned a predefined score, and the first credit card (Visa . . . 1471) is assigned a rank of 1 and is the primary card. Further, the second credit card (Visa . . . 0217) is assigned a rank of 2 and is the secondary card and even further, the third credit card (MasterCard . . . 0268) is assigned a rank of 3 and is a tertiary card.

The user interface 602 displays the step of 322 performed by the APS device 202 to select one of plurality of transaction or payment modes. In this example, the APS device 202 recommends the second credit card (Visa . . . 0217). Further user interface 603 displays the recommendation that is provided as a notification 603*c*. The notification includes a QR code 603*a* used for making a purchase, although any other types of notification can be included. The user of the purchase device 208(1) can scan the QR code at a point of sale terminal to make a payment to complete a purchase.

The user interface 601 displayed on the purchase device 208(1) also 601 includes a "App Settings" option 601*a* and a "Payment Settings" option 601*b*. The "App Settings" option 601*a* includes a toggle one/off button to activate/deactivate the option of "Auto Select Card". The activation of the "Auto Select Card" options enables the APS device 202 to automatically select and recommend a payment mode during purchases. The "App Settings" option 601*a* also includes a toggle on/off button to activate/deactivate the option of "Open "Pay" screen when app launches" upon activation of this button, when the user of the purchase device 208(1) opens the auto-payment selection mobile application 600 the APS device displays the user interfaces 602 that initiates automatically selecting and recommending a payment mode during purchases by the APS device 202.

Accordingly, with this technology, an optimized process of selecting and recommending a payment mode based on available user transaction or payment modes and the location of the user is provided. The automatic recommendation of the transaction or payment modes provides the users with an optimized process of making transactions by providing monetary savings and improving a user's credit history. Accordingly with this technology, a customized and intelligent payment process is provided that significantly improves a customer's shopping experience, thereby increasing customer satisfaction. Additionally, this technology facilitates more efficient processing of user account information such that more users are aware of their spending process.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system for facilitating selection of a transaction mode for an electronic transaction, the system comprising:
- a processor; and
- a memory including instructions that, when executed by the processor, cause the processor to perform operations, the operations including:
  - obtaining user identification information, the user identification information identifying a user of a user device, the user device performing the electronic transaction;
  - determining a plurality of user accounts of the user based on the user identification information;
  - obtaining location information of the user device, the location information being determined by a global positioning satellite device included in the user device;
  - obtaining at least one of sound information detected by a microphone of the user device or light information detected by a camera of the user device;
  - determining a single merchant based on the location information of the user device and the at least one of the sound information or the light information;
  - analyzing the plurality of user accounts and determining, based on the single merchant, a recommended user account from among the plurality of user accounts; and
  - generating a notification to be displayed on the user device based on the recommended user account,
- wherein the at least one of the sound information or the light information is obtained in response to the single merchant being unable to be determined from among plural merchants based on the location information of the user device.

2. The system according to claim 1, wherein the operations further include:
- initiating the electronic transaction via communication between the user device and a merchant device, and
- the at least one of the sound information or the light information is obtained after the electronic transaction is initiated and in response to the single merchant being unable to be determined from among the plural merchants.

3. The system according to claim 2, wherein the sound information detected by the microphone is obtained in the obtaining of the at least one of the sound information or the light information.

4. The system according to claim 3, wherein the operations further include:
- filtering the sound information to identify predetermined sounds which are associated with certain merchants.

5. The system according to claim 4, wherein the sound information is filtered to identify at least one of a sound of a machine, background music, or speech.

6. The system according to claim 2, wherein the light information detected by the camera is obtained in the obtaining of the at least one of the sound information or the light information.

7. The system according to claim 6, wherein the light information includes at least one of image information or video information.

8. The system according to claim 6, wherein the light information includes an amount of ambient light.

9. The system according to claim 2, wherein the notification is configured to be used to complete the electronic transaction using the recommended user account.

10. The system according to claim 9, wherein the notification includes a QR code or a barcode that, when scanned, is configured to complete the electronic transaction using the recommended user account.

11. The system according to claim 1, wherein the analyzing includes:
- determining at least one transaction mode that is accepted by the single merchant; and
- excluding, from the recommended user account, accounts of the plurality of user accounts that do not correspond to the at least one transaction mode that is accepted by the single merchant.

12. The system according to claim 1, wherein the analyzing includes:
- determining at least one account parameter associated with each of the plurality of user accounts; and
- assigning a score to each of the plurality of user accounts based on the associated at least one account parameter.

13. The system according to claim 1, wherein the analyzing includes:
- receiving, from the single merchant, at least one merchant-defined parameter associated with at least one transaction mode accepted by the single merchant;
- determining whether the at least one transaction mode corresponds to any of the plurality of user accounts; and
- in response to determining that the at least one transaction mode corresponds to any of the plurality of user accounts, further analyzing the plurality of user accounts based on the at least one merchant-defined parameter.

14. The system according to claim 1, wherein the recommended user account is determined from among the plurality of user accounts based on the analyzing, and further based on the location information of the user device.

15. The system according to claim 14, wherein the operations further include:
- excluding, from the recommended user account, at least one of the plurality of user accounts based on the location information of the user device.

16. The system according to claim 1, wherein
- the user identification information and the location information are received from the user device via a network,
- the notification is configured to be transmitted to the user device via the network, and
- the notification is further configured to be displayed on a display of the user device.

17. The system according to claim 1, wherein each of the processor and the memory is included in the user device.

18. A method for facilitating selection of a transaction mode for an electronic transaction, the method comprising:
- obtaining user identification information, the user identification information identifying a user of a user device, the user device performing the electronic transaction;

determining a plurality of user accounts of the user based on the user identification information;

obtaining location information of the user device, the location information being determined by a global positioning satellite device included in the user device;

obtaining at least one of sound information detected by a microphone of the user device or light information detected by a camera of the user device;

determining a single merchant based on the location information of the user device and the at least one of the sound information or the light information;

analyzing, by a processor, the plurality of user accounts and determining, based on the single merchant, a recommended user account from among the plurality of user accounts; and generating a notification to be displayed on the user device based on the recommended user account, wherein the at least one of the sound information or the light information is obtained in response to the single merchant being unable to be determined from among plural merchants based on the location information of the user device.

19. A non-transitory computer-readable medium including a set of instructions for facilitating selection of a transaction mode for an electronic transaction that, when executed by a computer, causes the computer to perform operations, the operations comprising:

obtaining user identification information, the user identification information identifying a user of a user device, the user device performing the electronic transaction;

determining a plurality of user accounts of the user based on the user identification information;

obtaining location information of the user device, the location information being determined by a global positioning satellite device included in the user device;

obtaining at least one of sound information detected by a microphone of the user device or light information detected by a camera of the user device;

determining a single merchant based on the location information of the user device and the at least one of the sound information or the light information;

analyzing the plurality of user accounts and determining, based on the single merchant, a recommended user account from among the plurality of user accounts; and generating a notification to be displayed on the user device based on the recommended user account, wherein the at least one of the sound information or the light information is obtained in response to the single merchant being unable to be determined from among plural merchants based on the location information of the user device.

* * * * *